United States Patent [19]
Thomas

[11] Patent Number: 5,481,789
[45] Date of Patent: Jan. 9, 1996

[54] METHOD FOR REMOVING A GEAR OR BEARING IN CIRCULAR CLARIFIERS AND THICKENERS

[75] Inventor: John Thomas, Brookfield, Wis.

[73] Assignee: Envirex, Inc., Waukesha, Wis.

[21] Appl. No.: 202,514

[22] Filed: Feb. 28, 1994

[51] Int. Cl.⁶ .................................................. B23P 19/00
[52] U.S. Cl. .................................. 29/426.5; 29/402.08
[58] Field of Search ........................... 29/402.01, 402.04, 29/402.08, 426.1, 426.2, 426.5; 210/520, 528

[56] References Cited

U.S. PATENT DOCUMENTS

| | | | |
|---|---|---|---|
| 3,539,051 | 11/1970 | Stone | 210/520 |
| 3,959,151 | 5/1976 | Liebowitz | 210/528 |
| 4,017,402 | 4/1977 | Fitch | 210/528 |
| 4,048,076 | 9/1977 | Pearre et al. | 210/528 |
| 5,194,155 | 3/1993 | Schwartz | 210/519 |
| 5,264,126 | 11/1993 | Shurtleff | 210/528 |

Primary Examiner—David P. Bryant
Attorney, Agent, or Firm—Michael, Best & Friedrich

[57] ABSTRACT

Disclosed herein is a simple and inexpensive system for removing a single piece ring gear from a tank of a circular clarifier without the need to completely remove a bridge mounted on a pier in the clarifier. The bridge remains useable while the gear is removed, repaired, or replaced.

3 Claims, 4 Drawing Sheets

METHOD FOR REMOVING A GEAR OR BEARING IN CIRCULAR CLARIFIERS AND THICKENERS

FIELD OF THE INVENTION

The invention relates generally to circular clarifiers and thickeners, of a type having a rotating sediment raking structure, used in the treatment of water, wastewater, or used in the mining industry.

BACKGROUND OF THE INVENTION

Circular clarifiers and thickeners include large circular tanks wherein a mixture of solids and liquids is held for separation of the solids from liquid. The mixture is typically wastewater, and the solids are generally in the form of sludge. The tanks may be as large as 600 feet in diameter, or even larger.

The term clarifier is generally employed to identify the structure described herein where there is a continuous flow of water through the tank. The term thickener is generally employed to describe the same structure where there is no continuous flow of water. The structure is the same for a clarifier or for a thickener. Therefore, the term clarifier, when used hereinafter, is meant to also encompass thickeners.

Such a clarifier includes a pier at the center of the tank, a motor on the pier, a large ring gear at the top of the pier and driven by the motor, a bearing engaging the ring gear, and a rake structure supported by the gear. The gear causes the rake structure to rotate about the tank. The rake structure scrapes solids that settle at the bottom of the tank. The bottom of the tank is inclined toward the center of the tank, and the solids get collected at the center of the tank, where the solids can be pumped out of the tank. The clarifier further includes a support on the pier, and a bridge mounted on the support and providing access from radially outside the tank to the top of the pier. The bridge is made of metal, such as steel, or of another suitable material, and is structurally capable of supporting workers and their equipment.

It is occasionally necessary to remove the gear from the tank for repair or replacement. Because the inner end of the bridge is supported on the pier, and because the gear encircles the support, the bridge has to be removed before the gear can be removed if the gear is a one piece gear.

Alternatively, the gear can be split, made of two or more pieces fastened together and capable of being disassembled. In such a configuration, the bearing arrangement comprises removable balls supported between removable steel strips. Such a configuration is commonly called a strip liner bearing/gear assembly.

More recently, unsplit gears with integral precision ball bearings have become very popular for use in circular clarifiers. It is intended that the gear and bearing will outlive other equipment in the clarifier and that the gear will not need to be removed from the tank. However, because the environment in circular clarifiers is corrosive, condensation occurs in lubricating oil in the bearing. This and other factors can lead to failure of the gear and bearing, necessitating removal of the gear and bearing from the tank. Before an unsplit bearing can be removed, the bridge must be removed, normally using a large crane or other lifting device. This causes great expense.

SUMMARY OF THE INVENTION

The invention provides a simple and inexpensive system for removing a single piece ring gear or bearing from a tank of a circular clarifier without the need to completely remove a bridge mounted on a pier in the clarifier. The bridge remains useable while the gear is removed, repaired, or replaced.

Other features and advantages of the invention will become apparent to those of ordinary skill in the art upon review of the following detailed description, claims, and drawings.

DETAILED DESCRIPTION OF THE PREFERRED EMBODIMENT OF THE INVENTION

Figure 2:
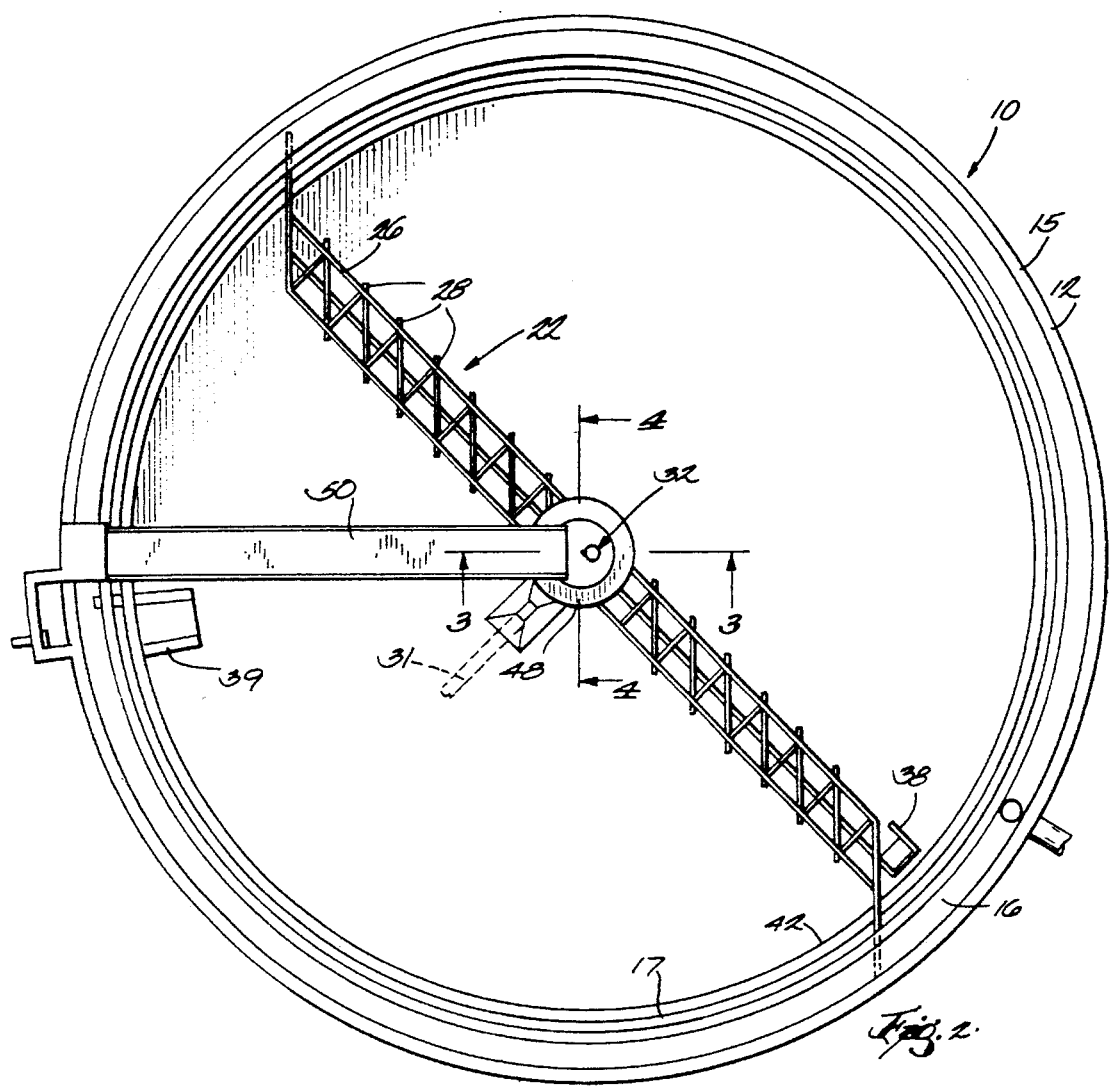
FIG. 2 is a top plan view of the circular clarifier of FIG. 1.
Figure 1:
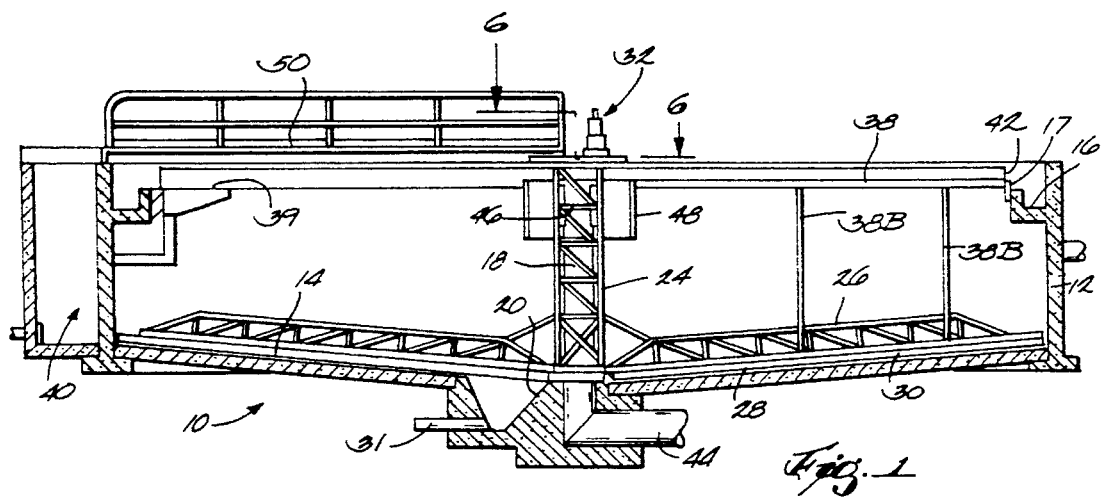
FIG. 1 is a partially broken away front elevational view of a circular clarifier (or thickener) including a central pier, a ring gear housed on the central pier, a rake structure supported by and rotated by the ring gear, and a bridge leading to the central pier and embodying various features of the invention.

Shown in the various figures is a clarifier 10 including a tank 12 having a bottom 14, having a generally cylindrical wall 15, and having an effluent launder 16. The clarifier 10 includes an effluent weir 17 extending along the inner circumference of the effluent launder 16 and extending vertically above the effluent launder 16. The clarifier 10 includes a central pier 18 extending upwardly from the bottom 14 of the tank 12 and having a top 19. In the illustrated embodiment, the top 19 of the pier 18 is defined by a metal plate; however, other materials or pier configurations could be employed. The tank 12 further includes a sludge sump 20 extending downwardly from the bottom 14 of the tank, adjacent the central pier 18. The bottom 14 of the tank 12 is sloped toward the center pier 18.

The clarifier 10 further includes a rake structure 22 including a vertically extending drive cage 24 surrounding the pier 18, and rake arms 26 extending generally radially from the bottom of the drive cage 24. The drive cage 24 and rake arms 26 are truss structures. The rake structure 22 further includes scraper blades 28 and squeegees 30 depending downwardly from the rake arms 26 for close sliding contact with the bottom 14 of the tank 12. The rake structure 22 is a rigid, girder type construction that is mounted in the tank 12 for rotation about the pier 18.

In an alternative embodiment (not shown), the rake arms 26 of the clarifier 10 are replaced with a "TOW-BRO" sludge removal equipment design comprising a long tube with holes along its length through which sludge is sucked for removal via the pipe 31.

The clarifier 10 further includes a drive unit or motor 32, on the top 19 of the pier 18, a reducer 33 driven by the drive unit 32 and having a shaft 33A, a pinion 34 driven by the shaft 33A of the reducer 33 and depending from the reducer 33, and an unsplit (unitary) large annular ring gear 35. The ring gear 35 is supported by an outer bearing ring 36A and a plurality of ball bearings or balls 36B. The clarifier 10 further includes a gear housing 37 mounted to the top 19 of the pier 18, which gear housing 37 includes inner and outer annular vertically upwardly extending walls defining therebetween a channel which houses the ring gear 35 and the outer bearing ring 36A. The outer bearing ring 36A is supported by the gear housing 37, and is bolted to the gear housing 37 by bolts 37B. The outer bearing ring 36A has a radially inwardly facing bearing race which houses and supports the plurality of balls 36B. The balls 36B engage a radially outwardly facing bearing race in the outer surface of the ring gear 35 and support the ring gear 35 for rotation about a central vertical axis with respect to the pier 18.

In the illustrated embodiment, the bearing ring 36A is mounted with the ring gear 35, and the bearing ring 36A and ring gear 35 are movable together when installed or removed. In alternative embodiments, the bearing ring 36A and the ring gear 35 are separate pieces that can be removed or installed independently of one another. The ring gear 35 is coaxial with the pier 18, has radially inwardly facing teeth driven by the pinion 34. The gear 35 and bearing ring 36A are at least partially immersed in lubricating oil in the gear housing 37. The gear housing 37 also supports a cover 41. The reducer 33 is mounted on the housing 37. The gear 35, through the vertically extending drive cage 24, supports and rotates the rake structure 22 about the pier 18. More particularly, the rake structure 22 further includes a top flat annular portion 24A that is bolted to the top of the gear 35 by bolts 25 and that is bolted to the drive cage 24 by bolts 25A. The rake structure 22 conveys settled solids or sludge to the sump 20.

The clarifier 10 further includes a sludge draw-off pipe 31, in communication with the sump 20, which is used to draw the settled solids or sludge out of the tank 12.

The clarifier 10 optionally includes a skimmer assembly comprising a skimmer blade 38, and vertical skimmer supports 38B attached to the rake arms 26 and supporting the skimmer blade 38. The skimmer blade 38 rotates with the rake arms 26 and skims the surface of the liquid in the tank 12. If the skimmer assembly is included, the clarifier 10 will also include a skimmer blade ramp and scum trough 39, extending radially inwardly by a short extent from an upper portion of the wall 15, having a small extent along the circumference of the wall 15. With each rotation of the rake arms 26, the skimmer blade 38 rides over the blade ramp and scum trough 39, and directs scum from the surface of the liquid in the tank 12 into the blade ramp and scum trough 39. The clarifier 10 may also optionally include a scum pit 40, outside the tank 12, which collects scum from the scum trough 39. If the skimmer blade 38 is included, the clarifier 10 will also include a scum baffle 42 along the inner circumference of the wall 15, radially outward of the skimmer blade 38, and having a vertical extent from above the surface of the liquid in the tank 12 to the effluent weir 17.

The clarifier 10 further includes an influent pipe 44, through which influent liquid to be treated is introduced into the tank 12. The influent pipe 44 extends from below the tank 12 through the center pier 18 and has an outlet 46 proximate the top 19 of the center pier 18. The clarifier 10 further includes a generally cylindrical influent baffle 48 surrounding the pier 18 and extending upwardly from a location below the outlet 46.

The bridge 50 has one end radially outward of the wall 15 and has another end above the center pier 18. The bridge 50 is above the tank 12. The bridge 50 allows maintenance personnel to access to the center pier 18.

Figure 6:
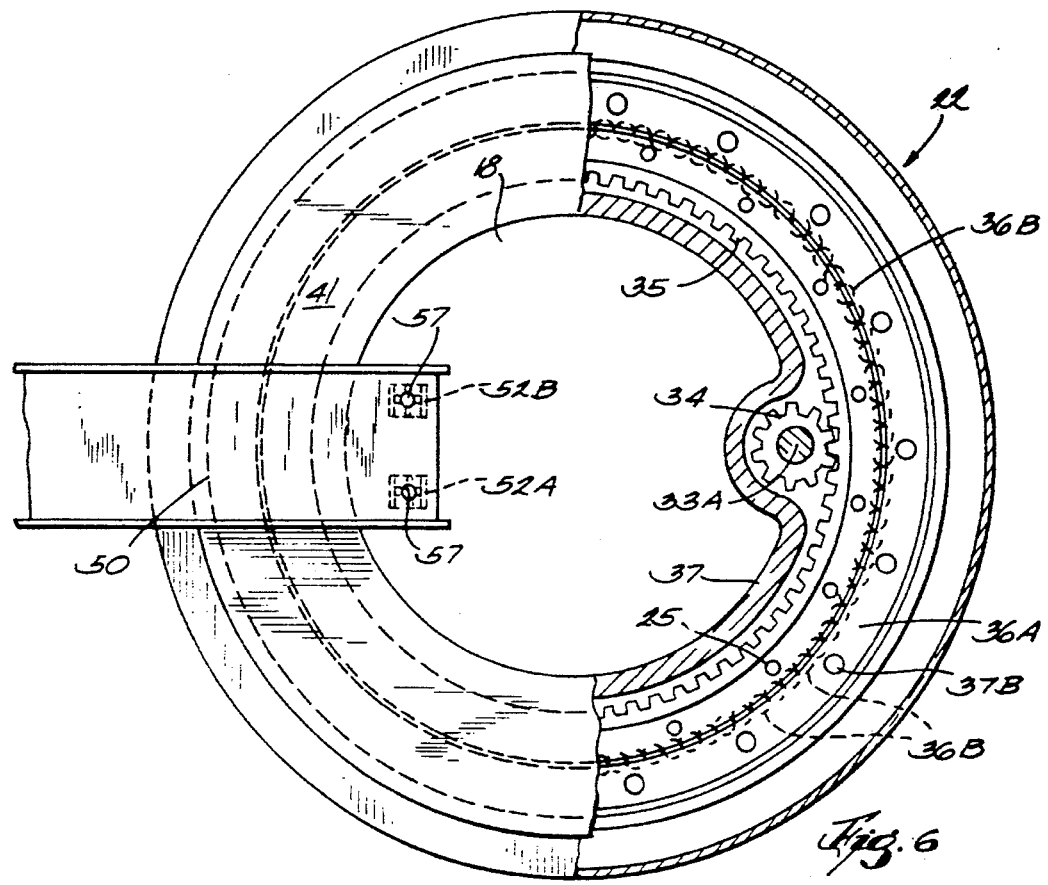
FIG. 6 is a top plan view showing the pier, bridge, bridge support, and ring gear included in the circular clarifier of FIG. 1.
Figure 3:
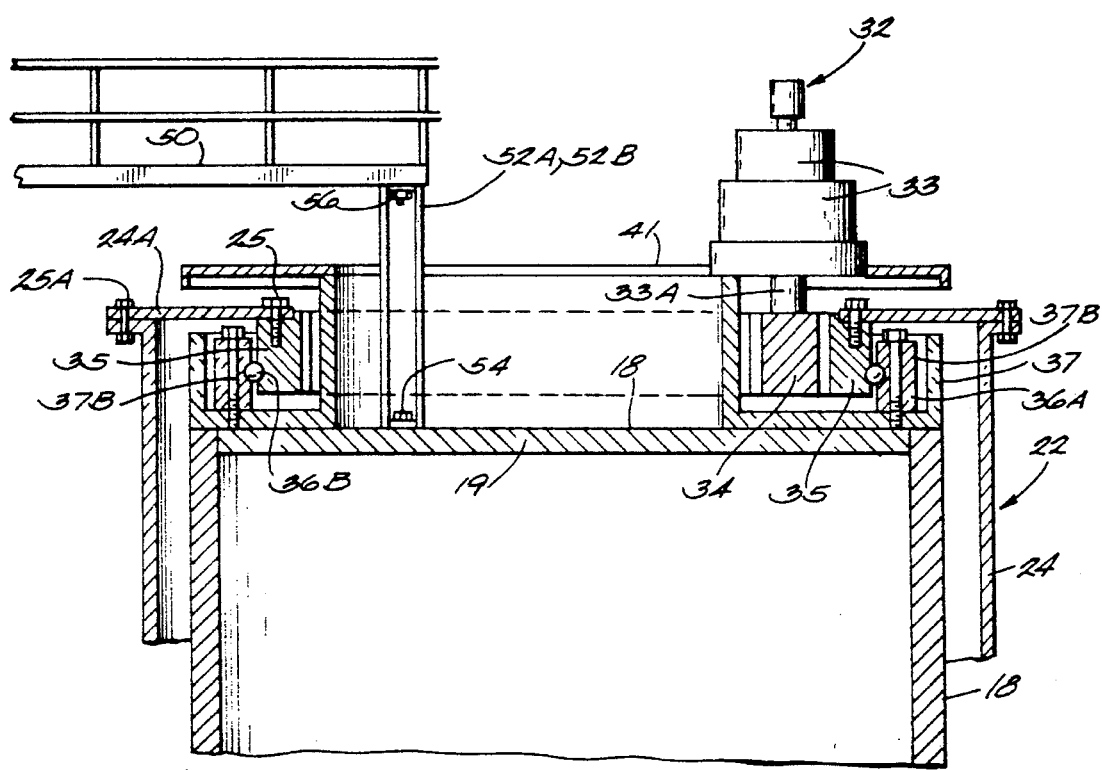
FIG. 3 is a front elevational view showing the pier and bridge of the circular clarifier of FIG. 1 and showing bridge supports supporting the bridge on the pier.

As shown in FIGS. 3 and 6, the clarifier 10 includes two or more spaced apart generally vertically extending bridge supports 52A and 52B supporting the bridge 50 on the pier 18. Each of the bridge supports 52A and 52B has a lower end removably secured to the top plate 19 of the pier 18 diametrically opposite to the pinion 34, e.g. by bolts 54. Each of the bridge supports 52A and 52B has an upper end which is removably secured to the bridge 50, at the end of the bridge 50 above the pier 18, e.g. by bolts 56. The bridge supports 52A and 52B support the bridge 50 above the top 19 of the gear housing 37. The bridge supports 52A and 52B define respective support positions which will be referred to below in connection with an explanation of the steps involved in removing the assembly of the gear 35 and bearing ring 36A. In the illustrated embodiment, the supports 52A and 52B are made of metal, such as steel; however, the supports could be made of any suitable material capable of supporting the bridge 50 and people and equipment on the bridge 50, and having a weight that is sufficiently low to allow the supports to be removed and carried away, as will be explained below. The supports can be removably secured to the pier 18 and to the bridge 50 in any suitable manner. It is conceivable that the bridge 50 could merely rest on the upper ends of the supports 52A and 52B without being fastened thereto, as long as some means are provided to prevent lateral movement of the bridge relative to the supports 52A and 52B.

In the preferred embodiment, the bridge supports 52A and 52B support the bridge 50 above the top of the gear housing 37 by a vertical distance that is greater than the total vertical extent (height) of the assembly of the gear 35 and bearing ring 36A. However, this is not a requirement.

Figure 5:
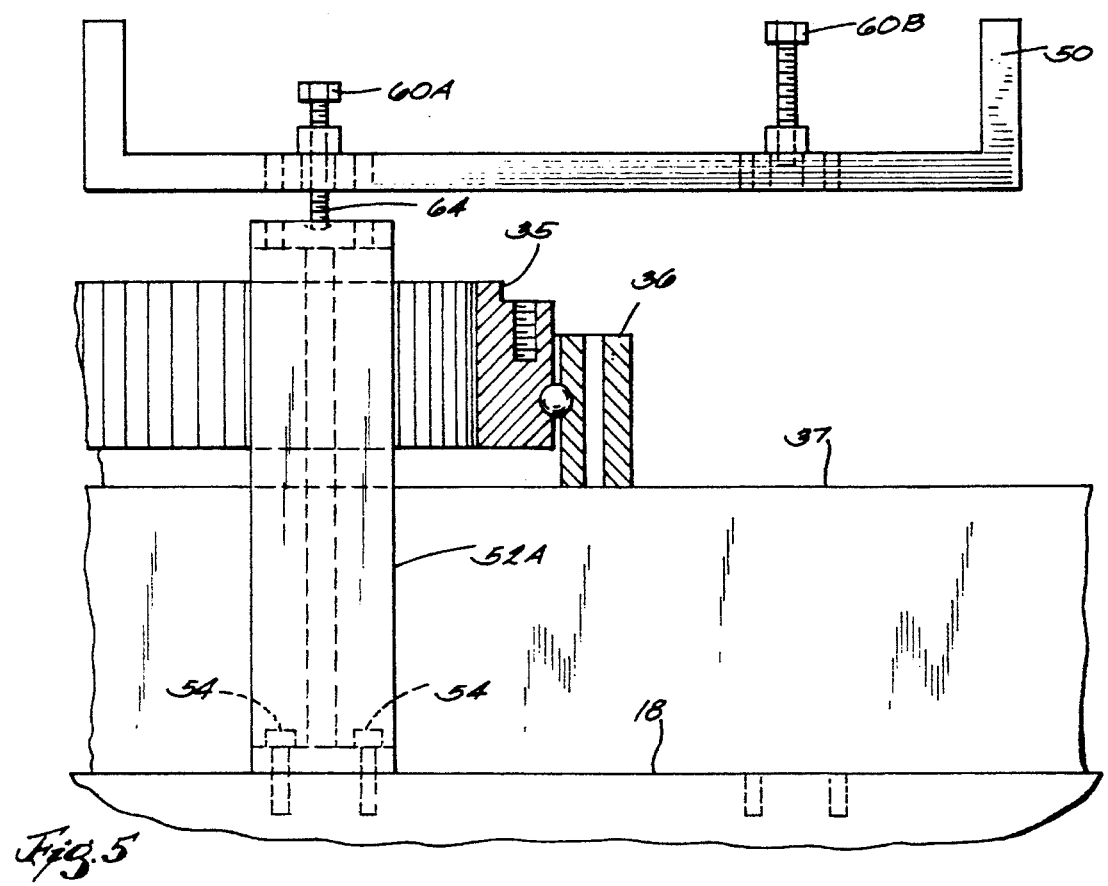
FIGS. 4 and 5 are side elevational views showing in more detail the bridge supports of FIG. 3, and illustrating a method of removing the ring gear from the circular clarifier of FIG. 1.
Figure 4:
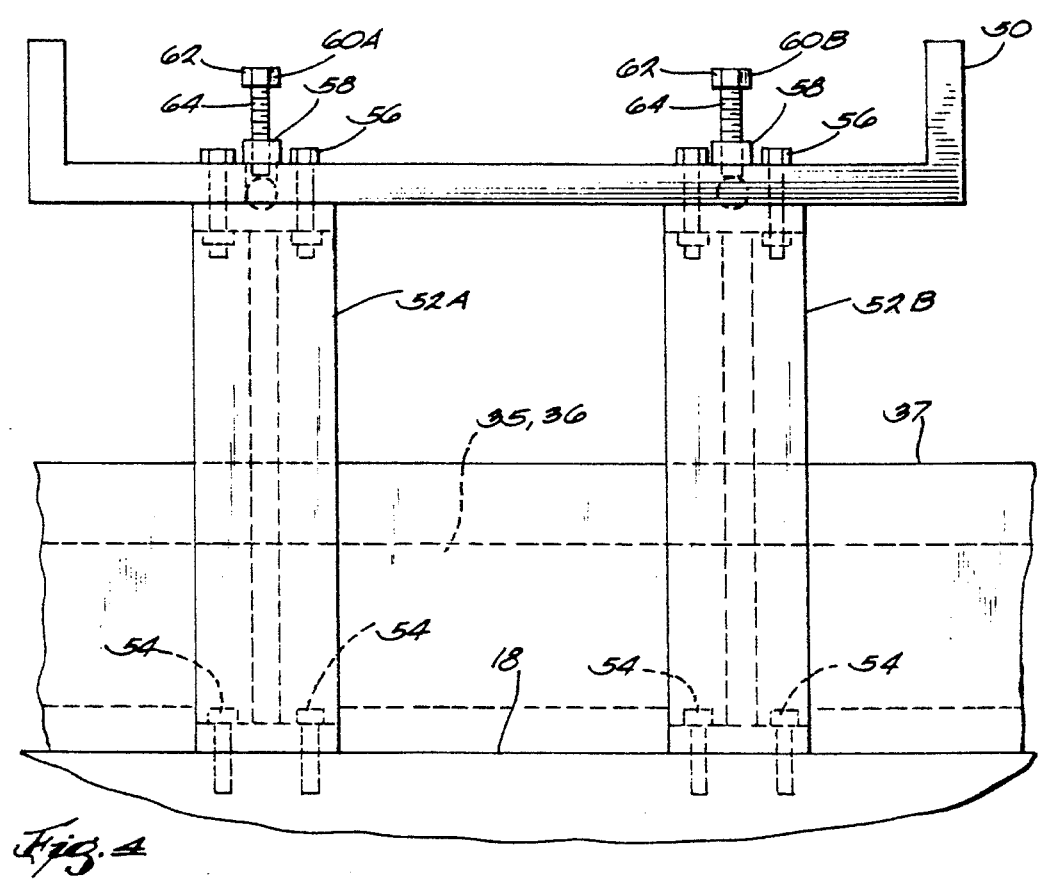

As best shown in FIGS. 4 and 5, a vertically extending bore 57 passes through the bridge 50 above each of the bridge supports 52A and 52B. The clarifier 10 further includes nuts (or other means defining a threaded vertically extending aperture) 58 housed in the bores 57 and welded or otherwise secured to the bridge 50. The nuts 58 are oriented to vertically receive bolts.

The clarifier 10 further includes bridge raising bolts 60A and 60B respectively threaded in the nuts 58. Each of the bolts 60A and 60B has a head 62 above the bridge 50 and has a threaded portion 64 selectively extending below the bridge 50 by a distance depending on how much the bolt 60A or 60B has been rotated in a clockwise direction relative to the nut 58 in which it is threaded. The bolts 60A and 60B extend through the bores 57 and selectively engage the bridge support 52A or 52B below it so as to raise the bridge 50 above the bridge support 52A or 52B, after bolts 56 have been removed, in a manner that will be described below. The top of the supports 52A and 52B optionally have a lip or slight recess defining a surface for receiving the bolt 60A or 60B, respectively.

To remove the gear 35 and bearing ring 36A from the gear housing 37, the following steps are performed.

The drive motor 32, reducer 33, and the cover 41 are removed from the housing 37, and the cage 24 is removed from the gear 35 by removing the bolts 25 and 25A. Then, the bolts 37B are removed so that the bearing ring 36A is disconnected from the gear housing 37.

The bolts 56 are then removed to permit the radially inner end of the bridge to be raised with respect to the upper ends of the supports 52A and 52B.

The bridge raising bolt 60A is rotated in the clockwise direction to engage or contact the top of the support 52A, and is further rotated in the clockwise direction to raise the bridge 50 enough to take the weight of the bridge 50 off of the support 52B. The support 52B is then removed by removing the bolts 54 securing it to the pier 18. The gear and bearing ring 35 and 36A are lifted above the gear housing 37 and translated laterally (to the left in FIG. 5) to a location (see FIG. 5) where they rest on the housing 37, and encircle the support position defined by the support 52A, but do not encircle the support position defined by the support 52B. The bridge support 52B is replaced and bolted to the pier 18 with bolts 54, but is not bolted to the bridge 50. The bolt 60B is then rotated clockwise to make contact with the top of the support 52B. The bolt 60A is then rotated counterclockwise (and, if necessary, the bolt 60B is rotated clockwise) to take the weight of the bridge 50 off of the support 52A. The bolts 54 securing the support 52A to the pier 18 are removed, and the support 52A is removed. The gear 35 and bearing ring 36A can then be completely removed (to the left in FIG. 5) so that they do not encircle either of the support positions. In an embodiment (not shown) where the gap between the bridge 50 and the housing 37 is not sufficient to permit the gear to be moved laterally, longer bolts 60A and 60B are employed so that the bridge 50 can be sufficiently raised.

To install a gear 35 and bearing ring 36A (e.g., a new or repaired gear and bearing assembly), the above steps are reversed.

While the above method steps have assumed that it would be desired to simultaneously remove the gear 35 and bearing ring 36A, in configurations where the gear 35 and bearing ring 36A are separable from one another, either the gear 35, or the bearing ring 36A, or both, can be removed and replaced in the manner described above.

In an alternative embodiment of the invention, the bridge supports 52A and 52B are releasably secured to the top of the housing 37 instead of to the center pier 18.

Figure 7:
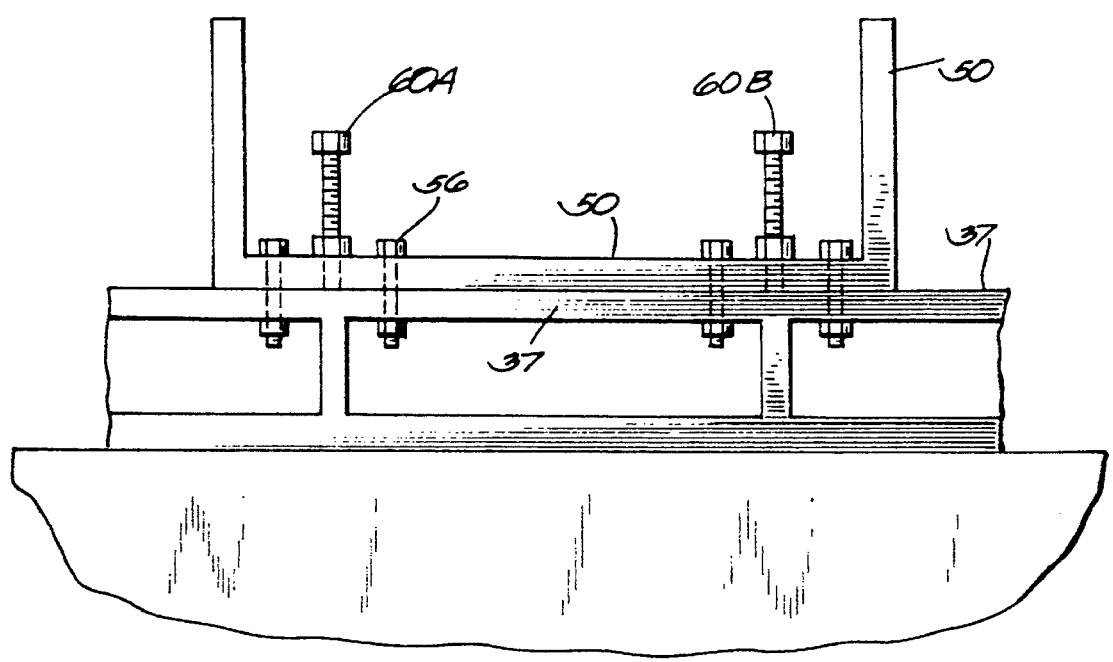
FIG. 7 is a side elevational view showing an alternative embodiment of the invention.

In another alternative embodiment of the invention (see FIG. 7), the bridge supports 52A and 52B are omitted, the bridge 50 rests on top of the housing 37, and the bridge raising bolts 60A and 60B engage the housing 37 to raise the bridge 50. The bolts 60A and 60B are long enough to raise the bridge 50 sufficiently to permit removal of the gear 35.

In yet another alternative embodiment, the nuts 58 can be fitted (e.g. welded) to the supports 52A and 52B, in alignment with a vertical bore through the support 52A or 52B, and the bolts 60A or 60B can be threaded from below the nuts 58 to extend upwardly into engagement with the bridge 50 to raise the bridge 50.

The method steps for removing or replacing the gear or bearing for these alternative embodiments, using the bolts 60A and 60B, are the same as they are for when bridge supports 52A and 52B are releasably secured to the top 19 of the center pier 18.

Modifications may be made to the preferred embodiment described and illustrated herein without departing from the spirit of the invention as expressed in the following claims.

I claim:

1. A method of removing a ring gear from a clarifier including a tank having a bottom and a wall extending upwardly from the bottom, a central pier extending vertically upwardly from the bottom of the tank and supporting the ring gear, a rake structure in the tank and supported by the ring gear for rotation with the ring gear relative to the tank, a bridge having a first end radially outward of the tank and having a second end above the central pier, a first bridge support spacing the second end of the bridge above the pier, the first bridge support being located within the inner periphery of the ring gear, a first selectively operable adjustment mechanism operating on the first bridge support to adjust the vertical position of the bridge relative to the pier, the first bridge support being selectively removable from a location where it supports the second end of the bridge, to a location where it does not support the second end of the bridge, a second bridge support located within the inner periphery of the ring gear, spaced apart from the first bridge support, a second selectively operable adjustment mechanism operating on the second bridge support to adjust the vertical position of the bridge relative to the pier, the second bridge support being selectively removable from a location where it supports the second end of the bridge, to a location where it does not support the second end of the bridge, said method comprising the following steps:

operating the first adjustment mechanism to raise the second end of the bridge, thereby removing the weight of the bridge from the second bridge support;

removing the second bridge support;

translating the gear past where the second bridge support used to be;

replacing the second bridge support;

and operating the first adjustment mechanism to lower the second end of the bridge, and operating the second adjustment mechanism to raise the second end of the bridge, thereby removing the weight of the bridge from the first bridge support;

removing the first bridge support; and translating the gear past where the first bridge support used to be.

2. A method of removing a ring gear from a circular clarifier having a tank including a bottom and a generally cylindrical wall extending upwardly from the bottom, a central pier extending vertically upwardly from the bottom of the tank, a gear housing on the central pier and housing the ring gear, a rake structure in the tank and rotated in the tank by the ring gear, a bridge having a first end radially outward of the tank and having a second end above the central pier, a first bridge support spacing the second end of the bridge above the housing by a selectively adjustable vertical distance, the first bridge support being located within the inner periphery of the ring gear, the first bridge support being selectively removable from a location where it supports the second end of the bridge, to a location where it does not support the second end of the bridge, a second bridge support located within the inner periphery of the ring gear, spaced apart from the first bridge support, the second bridge support spacing the second end of the bridge above the housing by a selectively adjustable vertical distance, the second bridge support being selectively removable from a location where it supports the second end of the bridge, to a location where it does not support the second end of the bridge, said method comprising the following steps:

shifting the weight of the bridge to the first bridge support;

removing the second bridge support;

translating the gear past where the second bridge support used to be;

replacing the second bridge support;

shifting the weight of the bridge to the second bridge support;

removing the first bridge support; and translating the gear past where the first bridge support used to be.

3. A method of removing a ring gear from a circular clarifier having a tank including a bottom and a generally cylindrical wall extending upwardly from said bottom, a central pier extending vertically upwardly from said bottom of said tank, a gear housing on said central pier and housing the ring gear, a rake structure supported by the ring gear for rotation in said tank, a bridge having a first end radially outward of said tank and having a second end above said central pier, a first selectively removable vertical bridge support located within the inner periphery of the ring gear and having an upper end selectively supporting said second end of said bridge and having a lower end supported by said pier, a second selectively removable vertical bridge support located within the inner periphery of the ring gear, spaced apart from said first bridge support, having an upper end selectively supporting said second end of said bridge and having a lower end supported by said pier, a first bridge raising bolt threadedly connected to said bridge above said first bridge support and having an end selectively extending below said bridge by a distance that is adjustable depending on how much said first bridge raising bolt is threaded, said end of said bolt selectively engaging said first bridge support to take the weight of said bridge off of said second bridge support, and a second bridge raising bolt threadedly connected to said bridge above said second bridge support and having an end selectively extending below said bridge by a distance that is adjustable depending on how much said second bridge raising bolt is threaded, said end of said bolt selectively engaging said second bridge support to take the weight of said bridge off of said first bridge support, said method comprising the following steps:

rotating the first bridge raising bolt to raise the second end of the bridge, thereby shifting the weight of the bridge to the first bridge support;

removing the second bridge support;

translating the gear past where the second bridge support used to be;

replacing the second bridge support;

and rotating the first bridge raising bolt to lower the second end of the bridge and rotating the second bridge raising bolt to raise the second end of the bridge, thereby shifting the weight of the bridge to the second bridge support;

removing the first bridge support; and translating the gear past where the first bridge support used to be.

* * * * *